No. 713,312. Patented Nov. 11, 1902.
E. B. KOOPMAN.
APPARATUS FOR EXHIBITING OR VIEWING ANIMATED PICTURES.
(Application filed Oct. 17, 1901.)
(No Model.)

Witnesses:
M. Lawson Dyar.
Benjamin Miller.

Elias Bernard Koopman, Inventor
by [signature] Att'ys

UNITED STATES PATENT OFFICE.

ELIAS BERNARD KOOPMAN, OF LONDON, ENGLAND.

APPARATUS FOR EXHIBITING OR VIEWING ANIMATED PICTURES.

SPECIFICATION forming part of Letters Patent No. 713,312, dated November 11, 1902.

Application filed October 17, 1901. Serial No. 78,919. (No model.)

*To all whom it may concern:*

Be it known that I, ELIAS BERNARD KOOPMAN, a citizen of the United States, residing at London, England, have made certain new and useful Improvements in Apparatus for Exhibiting or Viewing Animated Pictures, of which the following is a specification.

My present improvements are particularly directed to the class of apparatus in which the series pictures are mounted within a box or case and so actuated as to pass in such rapid sequence before an external opening or door that when the eye of the observer is applied to the opening the pictures present the appearance of a continuously-changing scene or living picture. Apparatus of this class has heretofore been limited to use by one observer at a time.

My object is to provide means whereby a single exhibiting-machine may be used by a number of persons at one time, each observer occupying an equally favorable point of view with all the others. In accomplishing this object I have employed means whereby a secondary object is attained—viz., the partial "projection" of the pictures—whereby they may be observed at some distance from the eyeholes of the apparatus.

While I have illustrated my present improvements in connection with a mutoscope—*i. e.*, an apparatus in which the pictures are attached to a series of opaque cards mounted upon a revoluble reel—it will be apparent that it may be applied to any living picture or panoramic exhibiting apparatus in which the pictures are viewed through a peep-hole.

Figure 1:
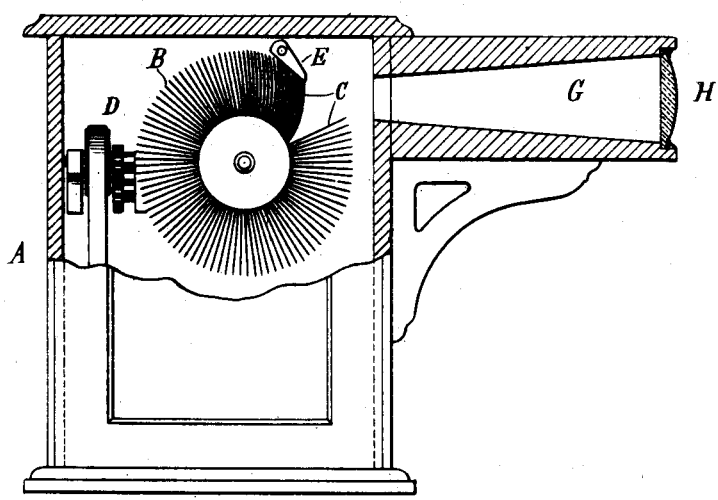
Figure 2:
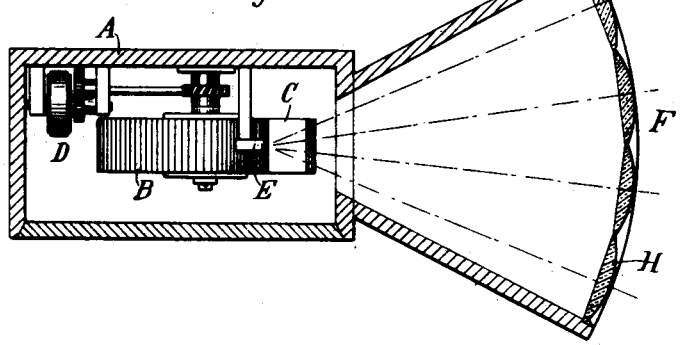
Figure 3:
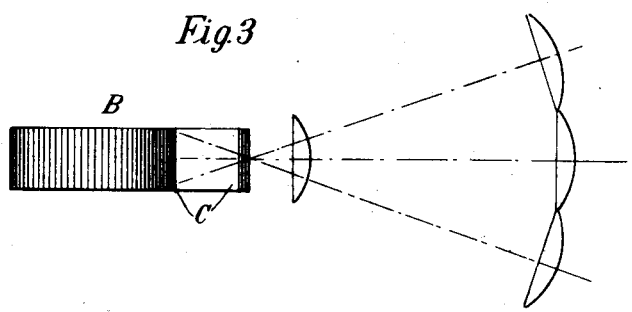

In the drawings which accompany and form part of this specification, Figure 1 represents in side elevation, partly in section, a picture-exhibiting apparatus with my improvements applied. Fig. 2 is a sectional view thereof. Fig. 3 is a diagram showing another (and preferred) arrangement of said parts.

A represents the case or covering of a picture-exhibiting apparatus—in this instance a mutoscope.

B is a revolubly-mounted reel carrying a series of cards C, on which are mounted successive pictures of an object in motion or other animated scene.

D represents mechanism for rotating the reel to produce in the eye of the observer of the pictures the desired impression of continuous motion, a pin or stop E being provided for engaging the upper ends of the cards C, so as to retard each sufficiently to expose its face to the point of observation. That portion of the case A toward which the faces of the successive pictures are so presented is curved, as shown at F, the radius of the curve being such as to form, approximately, the arc of a circle struck from a point at or near the center of the field of vision, or the point in front of which the series of pictures is exhibited. It will be observed, also, that the radius of the said curve is at right angles to the radius of the picture-reel, which is preferably so hung as to rotate in a vertical plane.

In the curved front F, I provide a sight-aperture in which is located a series of lenses H, which may be so arranged as to magnify each picture as it is arrested by the stop E. This series of lenses may be, as shown, on a horizontal plane. By this means the observer is enabled to view the animated or changing picture at some distance from the apparatus. As shown in Fig. 3, I may (and do, preferably) mount a single large lens I immediately in front of the reel B, this lens being between the pictures and the sight-holes in such position that each of the lenses H is on a focal radius of the central lens I. By this latter means all of the sight-apertures are brought into similar relation to the animated picture. Although I have shown my invention as applied to one form of exhibiting apparatus only, its adaptability to many others will be evident. It is also to be noted that many variations in the situation, number, and arrangement of the various lenses may be made without departing from my invention.

What I claim as my invention is—

1. In a living-picture-exhibiting apparatus, the combination of a case, means for moving the pictures to be displayed, and a series of lenses for viewing the pictures, said lenses being arranged approximately in the arc of a circle the center of which is at the center of the field of vision, substantially as and for the purposes described.

2. In a living-picture-exhibiting apparatus, the combination of a case provided with a curved front, a series of lenses in said curved front arranged approximately in the arc of a circle having its center at the field of vision, a series of pictures suitably mounted for exhibiting, and means for moving the series of pictures in such manner that each is displayed at substantially the center of vision of all of said lenses, as set forth.

3. In a living-picture-exhibiting apparatus, the combination of a case provided with a series of lenses, a series of pictures suitably mounted for exhibiting, a single lens placed at substantially the center of vision of each of said series of lenses, and means for moving the series of pictures in such manner that each is displayed at substantially the focus of said single lens, substantially as and for the purposes described.

ELIAS BERNARD KOOPMAN.

Witnesses:
ANDREW CAMERON,
W. J. S. TYACKE.